United States Patent
Nomura et al.

(10) Patent No.: US 8,877,702 B2
(45) Date of Patent: *Nov. 4, 2014

(54) DETERGENT COMPOSITION

(75) Inventors: Masato Nomura, Wakayama (JP);
Katsuhisa Inoue, Wakayama (JP);
Hisato Fukuda, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/383,497

(22) PCT Filed: Jul. 14, 2010

(86) PCT No.: PCT/JP2010/062276
§ 371 (c)(1),
(2), (4) Date: Jan. 20, 2012

(87) PCT Pub. No.: WO2011/007891
PCT Pub. Date: Jan. 20, 2011

(65) Prior Publication Data
US 2012/0115769 A1    May 10, 2012

(30) Foreign Application Priority Data
Jul. 17, 2009   (JP) .................. 2009-168758

(51) Int. Cl.
*C11D 17/00*   (2006.01)
*C11D 1/83*   (2006.01)
*C11D 1/29*   (2006.01)
*C11D 1/722*   (2006.01)

(52) U.S. Cl.
CPC ............. *C11D 1/8305* (2013.01); *C11D 1/29* (2013.01); *C11D 1/722* (2013.01)
USPC ........... 510/421; 510/424; 510/426; 510/505; 510/506

(58) Field of Classification Search
None
See application file for complete search history.

(56) References Cited

U.S. PATENT DOCUMENTS

| 4,259,215 A | 3/1981 | Murata et al. |
| 4,395,364 A * | 7/1983 | Murata et al. ............. 510/352 |
| 6,048,831 A | 4/2000 | Mori et al. |
| 2010/0160206 A1 | 6/2010 | Chiba et al. |

FOREIGN PATENT DOCUMENTS

| JP | 53-58508 A | 5/1978 |
| JP | 56-5895 A | 1/1981 |
| JP | 57-141499 A | 9/1982 |
| JP | 2010-47655 A | 3/2010 |
| WO | WO 98/24865 A1 | 6/1998 |
| WO | WO 2009/008542 A1 | 1/2009 |
| WO | WO 2009/084479 A1 | 7/2009 |

OTHER PUBLICATIONS

English machine translation of JP-57-141499-A dated Sep. 1, 1982.
English machine translation of WO-2009/084479-A1 dated Jul. 9, 2009.
English mahcine translation of JP-2010-47655-A dated Mar. 4, 2010.
International Search Report, dated Oct. 19, 2010 in PCT/JP2010/062276.
Chinese Office Action for Application No. 201080027595.X dated Aug. 15, 2012.

* cited by examiner

*Primary Examiner* — Necholus Ogden, Jr.
(74) *Attorney, Agent, or Firm* — Birch, Stewart, Kolasch & Birch, LLP

(57) ABSTRACT

The present invention relates to the detergent composition, containing (a) a nonionic surfactant represented by the formula (1); and (b) a sulfuric acid ester salt represented by the formula (2):

$$R-O-(EO)_m-(PO)_n-(EO)_{m'}-H \quad (1)$$

wherein, R represents a hydrocarbon group having 6 to 24 carbon atoms; EO represents an ethyleneoxy group; PO represents a propyleneoxy group; m=0.1 to 25; m'=0 to 24.9; m+m'=0.5 to 25; and n=0.1 to 10; with the proviso that $(EO)_m$, $(PO)_n$, and $(EO)_{m'}$ are arranged in a block addition mode in this order;

$$R^1-O-(PO)_x-(EO)_y-SO_3M \quad (2)$$

wherein, $R^1$ represents a hydrocarbon group having 6 to 24 carbon atoms; x=0.1 to 10; y=0 to 30; $(PO)_x$ and $(EO)_y$ are arranged in any order in any addition mode, being a block addition or a random addition, M is a counter ion.

13 Claims, No Drawings

DETERGENT COMPOSITION

FIELD OF THE INVENTION

The present invention relates to a detergent composition.

BACKGROUND OF THE INVENTION

Surfactant compositions containing a polyoxyethylene-based nonionic surfactant and an anionic surfactant together have high detergency and are widely used as a detergent, mixed with a diluent such as water.

Such a detergent containing a polyoxyethylene-based nonionic surfactant, an anionic surfactant, and water is however known to also exhibit a drastic decrease in fluidity under a cool temperature environment, which is difficult to handle, and further cause unfavorable phenomena accompanied by a decreased stability, such as separation and clouding. Methods for solving these problems generally contain addition of a solvent or the like and use of a surfactant at a certain concentration set to low. However, in some cases, addition of a solvent in an increased amount unfavorably leads to an inflammable detergent and adversely affects performances of a surfactant itself more than a little. Use of a surfactant at a low concentration has a problem of decreased fundamental performances such as detergency of a detergent composition.

To solve these problems, JP-A 53-58508 discloses a liquid detergent containing a polyoxypropylenepolyoxyethylene alkyl ether and a polyoxyethylene alkyl ether sulfate together, that exhibits good fluidity and stability at low temperature. WO-A 98/24865 discloses a surfactant composition containing an anionic surfactant and a nonionic surfactant prepared by adding ethylene oxide, propylene oxide, and ethylene oxide to a higher alcohol in this order, that is easy to handle and has good detergency. WO-A 2009/008542 discloses a surfactant containing an alkyl ether sulfuric acid ester salt.

SUMMARY OF THE INVENTION

The present invention provides a detergent composition, containing (a) a nonionic surfactant represented by the formula (1) [hereinafter, referred to as component (a)], and (b) a sulfuric acid ester salt represented by the formula (2) [hereinafter, referred to as component (b)]:

$$R-O-(EO)_m-(PO)_n-(EO)_{m'}-H \quad (1)$$

wherein, R represents a linear or branched, saturated or unsaturated hydrocarbon group having 6 to 24 carbon atoms; EO represents an ethyleneoxy group; PO represents a propyleneoxy group; m represents an average addition mole number ranging from 0.1 to 25; m' represents an average addition mole number ranging from 0 to 24.9; the total of m and m' is 0.5 to 25; and n represents an average addition mole number ranging 0.1 to 10; with the proviso that $(EO)_m$, $(PO)_n$, and $(EO)_{m'}$ are arranged in a block addition mode in this order;

$$R^1-O-(PO)_x-(EO)_y-SO_3M \quad (2)$$

wherein, $R^1$ represents a linear or branched, saturated or unsaturated hydrocarbon group having 6 to 24 carbon atoms; PO represents a propyleneoxy group; EO represents an ethyleneoxy group; x represents an average addition mole number ranging from 0.1 to 10; y represents an average addition mole number ranging from 0 to 30, $(PO)_x$ and $(EO)_y$ are arranged in any addition mode, being either a block addition or a random addition in any order, when y is not 0; and M represents a counter ion to form a salt.

DETAILED DESCRIPTION OF THE INVENTION

Technologies of JP-A 53-58508 and WO-A 98/24865 have not reached to a satisfactory level. There is still a need for developing a detergent having better performances.

The present invention provides a detergent composition containing a polyoxyethylene-based nonionic surfactant and an anionic surfactant, that has good fluidity and stability under a cool temperature environment, and more particularly that has good fluidity and stability and exhibits high detergency even under a cool temperature environment, or under conditions of high surfactant concentration, or in the absence of a solvent.

According to the present invention, provided is a detergent composition having good fluidity and stability at low temperature.

<Component (A)>

The component (a) is a nonionic surfactant represented by the formula (1). In the formula (1), R represents a linear or branched, saturated or unsaturated hydrocarbon group having 6 to 24 carbon atoms. From the point of quality of the nonionic surfactant, R is preferably a linear or branched saturated hydrocarbon group. From the point of detergency of the detergent composition of the present invention, R is more preferably a linear saturated hydrocarbon group. From the points of detergency of the detergent composition of the present invention and generality and ease of handling of a raw material, R is preferably a linear saturated hydrocarbon group having 8 to 22 carbon atoms, more preferably 8 to 18 carbon atoms, and even more preferably 8 to 16 carbon atoms.

In the formula (1), an average EO addition mole number m is the number ranging from 0.1 to 25, preferably 0.5 to 18, and more preferably 1 to 14. Another average EO addition mole number m' is the number ranging from 0 to 24.9, preferably 0.5 to 18, and more preferably 1 to 14. From the points of fluidity, stability, and detergency and the like under a cool temperature environment, the sum of m and m' (m+m') is equal to 0.5 to 25, preferably 1 to 20, and more preferably 2 to 15.

In the formula (1), from the points of fluidity and stability and the like under a cool temperature environment, an average PO addition mole number n is equal to 0.1 to 10, preferably 0.5 to 5, and more preferably 1 to 4.

It is preferable that the nonionic surfactant represented by the formula (1) used as the component (a) of the present invention can be produced from a linear or branched, saturated or unsaturated aliphatic alcohol represented by the formula (3):

$$R-OH \quad (3)$$

wherein, R represents the same meaning as defined above; by adding ethylene oxide and propylene oxide, and ethylene oxide as necessary in this order in a block addition mode. Use of the component (a) in combination with the component (b) described below in the detergent composition of the present invention provides good fluidity and stability under a cool temperature environment and high detergency in use to the detergent composition.

The component (a) is more particularly a nonionic surfactant having a block addition structure represented by the formula (1), that is produced by adding m* mol of ethylene oxide, n* mol of propylene oxide, and further m'* mol of ethylene oxide to one mol of a compound R—OH (wherein, R has the same meaning as above) in this order, wherein m* is the number ranging from 0.1 to 25, m'* is the number ranging from 0 to 24.9, the sum of m* and m'* is equal to 0.5 to 25, and n* is the number ranging from 0.1 to 10.

The detergent composition containing the component (a) having a block addition is a detergent composition containing (a) a nonionic surfactant produced by adding m* mol of ethylene oxide, n* mol of propylene oxide, and further m'* mol of ethylene oxide to one mole of a compound R—OH (wherein, R represents a linear or branched, saturated or unsaturated hydrocarbon group having 6 to 24 carbon atoms), wherein m* represents the number ranging from 0.1 to 25, m'* represents the number ranging from 0 to 24.9, a total of m* and m'* is 0.5 to 25, and n represents the number ranging from 0.1 to 10; and (b) a sulfuric acid ester salt represented by the formula (2)

Specific examples of the linear saturated aliphatic alcohol represented by the formula (3) include hexanol, octanol, decanol, dodecanol, tetradecanol, hexadecanol, octadecanol, eicosanol, and docosanol. Specific examples of the blanched saturated aliphatic alcohol include 2-ethylhexanol, isononanol, 6-methylundecanol, isotridecanol, and isostearyl alcohol. Specific examples of the linear unsaturated aliphatic alcohol include 9-decene-1-ol, oleyl alcohol, and linolyl alcohol. Among these alcohols, from the points of quality of the nonionic surfactant, availability, and ease of handling, preferred are linear or branched saturated aliphatic alcohols. From the point of detergency of the detergent composition of the present invention, more preferred are linear saturated aliphatic alcohols. These alcohols may be mixed each other to be used as necessary.

For adding an alkylene oxide (i.e., ethylene oxide/propylene oxide) to these alcohols, adding a conventional alkoxylation in the presence of a catalyst may be employed. The alkoxylation may use either an acidic catalyst or a basic catalyst.

One embodiment of producing the component (a) will be described below about a procedure and conditions. It is noted that the present invention should not be limited by the embodiment.

A reactor is used, that can be cooled/heated and decompressed/pressurized and includes an inlet of a raw material, an outlet of a product, supply ports of an alkylene oxide and nitrogen, a stirrer, a thermometer, and a manometer. First, in the reactor, to a predetermined amount of the aliphatic alcohol preferably used in the present invention as described above is added solid potassium hydroxide or sodium hydroxide or a solution thereof as an alkoxylation catalyst. The inside of the reactor is replaced with nitrogen and dehydrated at a room temperature (20° C.) to 110° C. under reduced pressure. Next, to the reaction mixture are added predetermined amounts of ethylene oxide, propylene oxide, and ethylene oxide (where m' is not equal to 0) in this order at 80 to 180° C. The stage of adding an alkylene oxide preferably includes an operation of allowing a reaction to continue from incorporation of a predetermined amount of the alkylene oxide until a decreased and constant pressure (operation of aging). To the obtained reactive crude product is then added an appropriate amount of a conventional acid to neutralize the catalyst. A desired component (a) thus can be produced. In an operation of neutralization, an alkali adsorbent can be used to remove the catalyst.

<Component (B)>

The component (b) is a sulfuric acid ester salt represented by the formula (2). In the formula (2), $R^1$ represents a linear or branched, saturated or unsaturated hydrocarbon group having 6 to 24 carbon atoms. From the point of quality of the sulfuric acid ester salt, preferred are linear or branched saturated hydrocarbon groups. From the point of detergency of the detergent composition of the present invention, more preferred are linear saturated hydrocarbon groups. From the points of detergency of the detergent composition of the present invention, and generality and ease of handling of a raw material, preferred are linear saturated hydrocarbon groups having 8 to 22 carbon atoms, more preferably 8 to 18 carbon atoms, and even more preferably 8 to 16 carbon atoms.

In the formula (2), a counter ion of the sulfuric acid ester salt is not specifically limited. Specific examples of the counter ion include alkaline metal ions such as of sodium and potassium, alkaline earth metal ions such as of magnesium and calcium, and protonated ions of amines and ammonias. Preferred are alkaline metal ions and protonated ions of alkanolamines and ammonias.

In the formula (2), from the points of fluidity and stability and the like under a cool temperature environment, an average PO addition mole number x is equal to 0.1 to 10, preferably 0.2 to 5, and more preferably 0.4 to 3.

In the formula (2), from the points of fluidity, stability, and detergency and the like under a cool temperature environment, an average EO addition mole number y is equal to 0 to 30, preferably 0 to 10, more preferably 0 to 4, and even more preferably 0 to 3.

In the formula (2), PO and EO can be added in any order. An addition mode may be of block or random. To achieve the effects of the present invention in combination of the component (a), PO and EO are preferably added as blocks in this order.

The sulfuric acid ester salt of the formula (2) used in the component (b) of the present invention can be produced from a linear or branched, saturated or unsaturated aliphatic alcohol represented by the formula (4):

$$R^1\text{—OH} \tag{4}$$

wherein, $R^1$ represents the meanings defined as above, by adding propylene oxide and ethylene oxide as necessary to obtain an alkoxylate, sulfating the alkoxylate, and neutralizing the sulfate. Presence of the component (b) in combination with the component (a) provides the detergent composition of the present invention with good fluidity and stability and high detergency under a cool temperature environment.

Specific examples and preferred embodiments of the linear or branched, saturated or unsaturated aliphatic alcohol represented by the formula (4) are the same to those described for the linear or branched, saturated or unsaturated aliphatic alcohol represented by the formula (3).

[Detergent Composition]

The detergent composition of the present invention contains the components (a) and (b) above. In the detergent composition, a content of the component (a) is preferably 1 to 70% by weight, and more preferably 3 to 60% by weight. A content of the component (b) is preferably 1 to 60% by weight, and more preferably 3 to 50% by weight. The balance of the detergent composition of the present invention may be water. In the present invention, the content of the component (b) described is calculated based on the assumption that the component (b) is in a form of sodium salt.

In cases of using the detergent composition of the present invention as a detergent for clothing, a content of the component (a) is preferably 3 to 60% by weight, and more preferably 5 to 50% by weight, and a content of the component (b) is preferably 2 to 50% by weight, and more preferably 3 to 40% by weight. A pH at 20° C. is preferably 4 to 13, and more preferably 5 to 12. The pH can be adjusted with a pH adjusting agent such as sodium hydroxide, potassium hydroxide, alkanolamine, sulfuric acid, and hydrochloric acid.

In cases of using the detergent composition of the present invention as a detergent for light-weight clothing such as a composition for hand-washing a clothing, a pH at 20° C. is preferably 4 to 11, and more preferably 5 to 9.

In cases of using the detergent composition of the present invention as a detergent for hard surface such as of glass, plastics, and metals, a content of the component (a) is preferably 1 to 60% by weight, and more preferably 2 to 50% by weight, and a content of the component (b) is preferably 1 to 50% by weight, and more preferably 2 to 40% by weight. A pH at 20° C. is preferably 3 to 13, and more preferably 4 to 12.

In the detergent composition of the present invention, a proportion of the component (a) to the total amount of components (a) and (b), [(content of the component (a))/(content of the component (a)+content of the component (b))]×100 is preferably 10 to 90% by mole, more preferably 15 to 85% by mole, and even more preferably 20 to 80% by mole.

From the point of detergency, the detergent composition of the present invention preferably further contains a Ca scavenger [hereinafter, referred to as component (c)] in addition to the components (a) and (b). Examples of the Ca scavenger include citric acid, sodium diethylenetriaminepentamethylenephosphonate, sodium tripolyphosphate, and aluminum sodium silicate. Preferred are citric acid, and sodium diethylenetriaminepentamethylenephosphonate.

When the component (c) is used, in the detergent composition, a content of the component (c) is preferably 1 to 30% by weight, more preferably 2 to 20% by weight, and even more preferably 3 to 15% by weight.

The detergent composition of the present invention can further contains other additive such as higher fatty acid, publicly-known chelating agent, anti-redeposition agent (e.g., polyethylene glycol, and carboxymethylcellulose), emulsifier (e.g., polyvinyl acetate, vinyl acetate styrene polymer, and polystyrene) in addition to the components (a) to (c) within the range that does not impair the effects of the present invention.

As a solvent for decreasing viscosity, ethanol, isopropyl alcohol, and propylene glycol and the like can be used. In the detergent composition of the present invention, for preventing onset of flammability, a content of the solvent is preferably less than 5% by weight, and more preferably less than 3% by weight.

It is noted that the detergent composition of the present invention has good fluidity (low viscosity) under a cool temperature environment even without such a solvent.

Examples of other component that can be added also include publicly-known thickener, bleach, enzyme, and preservative. To further increase detergency and the like, the detergent composition can further contain other ionic surfactant, including a nonionic surfactant other than the component (a), an anionic surfactant other than component (b), a cationic surfactant, and an amphoteric surfactant. In cases of using a nonionic surfactant other than the component (a), a proportion of the component (a) in the total amount of nonionic surfactants is preferably not less than 1% by weight to less than 100% by weight, more preferably not less than 10% by weight to less than 100% by weight, even more preferably not less than 30% by weight to less than 100% by weight, and still even more preferably not less than 50% by weight to less than 100% by weight. A proportion of the component (a) in the whole surfactant is preferably 1 to 95% by weight, and more preferably 5 to 90% by weight. In cases of using an ionic surfactant other than the component (b), a proportion of the component (b) in the total amount of ionic surfactants is preferably not less than 1% by weight to less than 100% by weight, more preferably not less than 10% by weight to less than 100% by weight, even more preferably not less than 30% by weight to less than 100% by weight, and still even more preferably not less than 50% by weight to less than 100% by weight. A proportion of the component (b) in the whole surfactant is preferably 1 to 95% by weight, and more preferably 5 to 90% by weight.

The detergent composition of the present invention has good fluidity and stability and exhibits high detergency under a cool temperature environment, and thus can be used for a wide variety of applications, including detergents for clothing, for hard surface such as glass, plastics, and metal, for body such as hand, hair, and face, and in the cosmetic and the aesthetic fields.

EXAMPLES

The following Examples and Comparative Examples are demonstrated in the present invention. These Examples are intended to illustrate the present invention and not to limit the present invention.

The term "%" refers to, unless otherwise designated, "% by weight".

Components used in Examples and Comparative Examples are listed below.

<Component (A)>
(a-1): nonionic surfactant (1) prepared in Synthesis Example 1
(a-2): nonionic surfactant (2) prepared in Synthesis Example 2
(a-3): nonionic surfactant (3) prepared in Synthesis Example 3
(a-4): nonionic surfactant (4) prepared in Synthesis Example 4
(a-5): nonionic surfactant (5) prepared in Synthesis Example 5
(a-6): nonionic surfactant (6) prepared in Synthesis Example 6
<Component (A')>[Comparative Component to Component (A)]
(a'-1): nonionic surfactant (7) prepared in Synthesis Example 7
(a'-2): nonionic surfactant (8) prepared in Synthesis Example 8
(a'-3): nonionic surfactant (9) prepared in Synthesis Example 9
(a'-4): nonionic surfactant (10) prepared in Synthesis Example 10
(a'-5): nonionic surfactant (11) prepared in Synthesis Example 11
<Component (B)>
(b-1): sulfuric acid ester salt (1) prepared in Synthesis Example 12
(b-2): sulfuric acid ester salt (2) prepared in Synthesis Example 13
(b-3): sulfuric acid ester salt (3) prepared in Synthesis Example 14
(b-4): sulfuric acid ester salt (4) prepared in Synthesis Example 15
<Component (B')>[Comparative Component to Component (B)]
(b'-1): sulfuric acid ester salt (5) comparative product to 16
(b'-2): sulfuric acid ester salt (6) comparative product to 17
(b'-3): sulfuric acid ester salt (7) comparative product to 18
<Component (C)>
(c-1): citric acid
<Other Component>
(d-1): LAS-Na (sodium alkylbenzenesulfonate)
(e-1): fatty acid (Lunac L-55, Kao Corporation)
(f-1): propylene glycol

Synthesis Example 1

Preparation of Nonionic Surfactant (1)

In an autoclave equipped with a stirrer, a temperature controller, and an automatic feeder, a mixed alcohol of 139.1 g of linear saturated alcohol having 12 carbon atoms [trade name: Kalcol 2098, Kao Corporation] and 53.9 g of linear saturated alcohol having 14 carbon atoms [trade name: Kalcol 4098, Kao Corporation] ($C_{12}$ alcohol/$C_{14}$ alcohol (molar ratio)=74.8/25.2) and then 1.1 g of potassium hydroxide were introduced and dehydrated for 30 minutes at 110° C. under 1.3 kPa. The inner atmosphere of the autoclave was replaced with nitrogen. Then the temperature was elevated to 140° C., 235 g of ethylene oxide was to the reaction mixture to carry out the addition reaction and aging. Then at a cooled temperature to 120° C., to the reaction mixture was added 155 g of propylene oxide to carry out the addition reaction and aging. Again at an elevated temperature to 140° C., to the reaction mixture was added 235 g of ethylene oxide to carry out the addition reaction and aging. After the completion of the reaction, to the autoclave cooled to 80° C. was added 1.2 g of acetic acid. The mixture was stirred for 30 minutes at 80° C. and taken out to obtain a nonionic surfactant (1) according to the present invention having the formula (1) [wherein, R had a molar ratio of n-$C_{12}$/n-$C_{14}$ equal to 74.8/25.2 (wherein, "n-$C_p$" represents a linear saturated hydrocarbon group having p carbon atoms), m=4, n=2, and m'=4] (see, Table 1).

Synthesis Example 2

Preparation of Nonionic Surfactant (2)

In an autoclave equipped with a stirrer, a temperature controller, and an automatic feeder, a mixture of 9.6 g of linear saturated alcohol having 8 carbon atoms [trade name: Kalcol 0898, Kao Corporation], 28.6 g of linear saturated alcohol having 10 carbon atoms [trade name: Kalcol 1098, Kao Corporation], 72.5 g of linear saturated alcohol having 12 carbon atoms [trade name: Kalcol 2098, Kao Corporation], 51.6 g of linear saturated alcohol having 14 carbon atoms [trade name: 4098, Kao Corporation], 19.1 g of linear saturated alcohol having 16 carbon atoms [trade name: Kalcol 6098, Kao Corporation], and 9.5 g of linear saturated alcohol having 18 carbon atoms [trade name: Kalcol 8098, Kao Corporation] ($C_8$ alcohol/$C_{10}$ alcohol/$C_{12}$ alcohol/$C_{14}$ alcohol/$C_{16}$ alcohol/$C_{18}$ alcohol (molar ratio)=7.4/18.1/39/24.1/7.9/3.5) and 1.1 g of potassium hydroxide were introduced and dehydrated for 30 minutes at 110° C. under 1.3 kPa. The inner atmosphere of the autoclave was replaced with nitrogen. At an elevated temperature to 140° C., to the reaction mixture was added 132 g of ethylene oxide to carry out the addition reaction and aging. Then at a cooled temperature to 120° C., to the reaction mixture was added 145 g of propylene oxide to carryout the addition reaction and aging. Again at an elevated temperature to 140° C., to the reaction mixture was added 132 g of ethylene oxide to carry out the addition reaction and aging. After the completion of the reaction, to the autoclave cooled to 80° C. was added 1.2 g of acetic acid. The mixture was stirred for 30 minutes at 80° C. and taken out to obtain a nonionic surfactant (2) according to the present invention having the formula (1) [wherein, R had a molar ratio of n-$C_8$/n-$C_{10}$/n-$C_{12}$/n-$C_{14}$/n-$C_{16}$/n-$C_{18}$ equal to 7.4/18.1/39/24.1/7.9/3.5, m=3, n=2.5, and m'=3] (see, Table 1).

Synthesis Example 3

Preparation of Nonionic Surfactant (3)

In an autoclave equipped with a stirrer, a temperature controller, and an automatic feeder, a mixture of 38.2 g of linear saturated alcohol having 10 carbon atoms [trade name: Kalcol 1098, Kao Corporation], 76.4 g of linear saturated alcohol having 12 carbon atoms [trade name: Kalcol 2098, Kao Corporation], 57.4 g of linear saturated alcohol having 14 carbon atoms [trade name: Kalcol 4098, Kao Corporation], and 19.1 g of linear saturated alcohol having 16 carbon atoms [trade name: Kalcol 6098, Kao Corporation] ($C_{10}$ alcohol/$C_{12}$ alcohol/$C_{14}$ alcohol/$C_{16}$ alcohol (molar ratio)=24.2/41.1/26.8/7.9) and 1.1 g of potassium hydroxide were introduced and dehydrated for 30 minutes at 110° C. under 1.3 kPa. The inner atmosphere of the autoclave was replaced with nitrogen. At an elevated temperature to 140° C., to the reaction mixture was added 352 g of ethylene oxide to carry out the addition reaction and aging. Then at a cooled temperature to 120° C., to the reaction mixture was added 174 g of propylene oxide to carry out the addition reaction and aging. Again at an elevated temperature to 140° C., to the reaction mixture was added 352 g of ethylene oxide to carry out the addition reaction and aging. After the completion of the reaction, to the autoclave cooled to 80° C. was added 1.2 g of acetic acid. The mixture was stirred for 30 minutes at 80° C. and taken out to obtain a nonionic surfactant (3) according to the present invention having the formula (1) [wherein, R had a molar ratio of n-$C_{10}$/n-$C_{12}$/n-$C_{14}$/n-$C_{16}$ equal to 24.2/41.1/26.8/7.9, m=8, n=3, and m'=8] (see, Table 1).

Synthesis Example 4

Preparation of Nonionic Surfactant (4)

In an autoclave equipped with a stirrer, a temperature controller, and an automatic feeder, a mixture of 139.1 g of linear saturated alcohol having 12 carbon atoms [trade name: Kalcol 2098, Kao Corporation] and 53.9 g of linear saturated alcohol having 14 carbon atoms [trade name: Kalcol 4098, Kao Corporation] ($C_{12}$ alcohol/$C_{14}$ alcohol (molar ratio)=74.8/25.2) and 1.1 g of potassium hydroxide were introduced and dehydrated for 30 minutes at 110° C. under 1.3 kPa. The inner atmosphere of the autoclave was replaced with nitrogen. Then at an elevated temperature to 140° C., to the reaction mixture was added 352 g of ethylene oxide to carry out the addition reaction and aging. Then at a cooled temperature to 120° C., to the reaction mixture was added 116 g of propylene oxide to carry out the addition reaction and aging. After the completion of the reaction, to the autoclave cooled to 80° C. was added 1.2 g of acetic acid. The mixture was stirred for 30 minutes at 80° C. and taken out to obtain a nonionic surfactant (4) according to the present invention having the formula (1) [wherein, R had a molar ratio of n-$C_{12}$/n-$C_{14}$ equal to 74.8/25.2, m=8, n=2, and m'=0] (see, Table 1).

Synthesis Example 5

Preparation of Nonionic Surfactant (5)

In an autoclave equipped with a stirrer, a temperature controller, and an automatic feeder, a mixture of 19.2 g of linear saturated alcohol having 8 carbon atoms [trade name: Kalcol 0898, Kao Corporation], 15.8 g of linear saturated alcohol having 10 carbon atoms [trade name: Kalcol 1098, Kao Corporation], 76.4 g of linear saturated alcohol having 12 carbon atoms [trade name: Kalcol 2098, Kao Corporation], 57.4 g of linear saturated alcohol having 14 carbon atoms [trade name: 4098, Kao Corporation], 9.2 g of linear saturated alcohol having 16 carbon atoms [trade name: Kalcol 6098, Kao Corporation], and 9.5 g of linear saturated alcohol having 18 carbon atoms [trade name: Kalcol 8098, Kao Corporation] ($C_8$ alcohol/$C_{10}$ alcohol/$C_{12}$ alcohol/$C_{14}$ alcohol/$C_{16}$ alcohol/$C_{18}$ alcohol (molar ratio)=14.8/10/41.1/26.8/3.8/3.5) and 1.1 g of potassium hydroxide were introduced and dehydrated for 30 minutes at 110° C. under 1.3 kPa. The inner atmosphere of the autoclave was replaced with nitrogen. At an elevated temperature to 140° C., to the reaction mixture was added 308 g of ethylene oxide to carry out the addition reaction and aging. Then at a cooled temperature to 120° C., to the reaction mixture was added 145 g of propylene oxide to carry out the addition reaction and aging. After the completion of the reaction, to the autoclave cooled to 80° C. was added 1.2 g of acetic acid. The mixture was stirred for 30 minutes at 80° C. and taken out to obtain a nonionic surfactant (5) according to the present invention having the formula (1) [wherein, R had a molar ratio of n-$C_8$/n-$C_{10}$/n-$C_{12}$/n-$C_{14}$/n-$C_{16}$/n-$C_{18}$ equal to 14.8/10/41.1/26.8/3.8/3.5, m=7, n=2.5, and m'=0] (see, Table Synthesis Example 6

Preparation of Nonionic Surfactant (6)

In an autoclave equipped with a stirrer, a temperature controller, and an automatic feeder, 194 g of synthetic alcohol [trade name: SAFOL 23 (SASOL), a saturated alcohol bearing branched alkyl groups having 12 and 13 carbon atoms ($C_{12}$ alkyl/$C_{13}$ alkyl (molar ratio)=55/45, branching rate (branching rate=(1−weight of linear alcohols/total weight of alcohols)): 50%)] and 1.1 g of potassium hydroxide were introduced and dehydrated for 30 minutes at 110° C. under 1.3 kPa. The inner atmosphere of the autoclave was replaced with nitrogen. Then at an elevated temperature to 140° C., to the reaction mixture was added 176 g of ethylene oxide to carry out the addition reaction and aging. Then at a cooled temperature to 120° C., to the reaction mixture was added 116 g of propylene oxide to carry out the addition reaction and aging. Again at an elevated temperature to 140° C., to the reaction mixture was added 176 g of ethylene oxide to carry out the addition reaction and aging. After the completion of the reaction, to the autoclave cooled to 80° C. was added 1.2 g of acetic acid. The mixture was stirred for 30 minutes at 80° C. and taken out to obtain a nonionic surfactant (6) according to the present invention having the formula (1) [wherein, R had a molar ratio of nb-$C_{12}$/nb-$C_{13}$ equal to 55/45 (wherein, "nb-$C_p$" represents a linear or branched hydrocarbon group having p carbon atoms), branching rate: 50%, m=4, n=2, and m'=4] (see, Table 1).

Synthesis Example 7

Preparation of Nonionic Surfactant (7)

In an autoclave equipped with a stirrer, a temperature controller, and an automatic feeder, a mixture of 139.1 g of linear saturated alcohol having 12 carbon atoms and 53.9 g of linear saturated alcohol having 14 carbon atoms ($C_{12}$ alcohol/$C_{14}$ alcohol (molar ratio)=74.8/25.2) and 1.1 g of potassium hydroxide were introduced and dehydrated for 30 minutes at 110° C. under 1.3 kPa. The inner atmosphere of the autoclave was replaced with nitrogen. Then at an elevated temperature to 140° C., to the reaction mixture was added 441 g of ethylene oxide to carry out the addition reaction and aging. After the completion of the reaction, to the autoclave cooled to 80° C. was added 1.2 g of acetic acid. The mixture was stirred for 30 minutes at 80° C. and taken out to obtain a nonionic surfactant (7) as a comparative component applying to the formula (1) [wherein, R had a molar ratio of n-$C_{12}$/n-$C_{14}$ equal to 74.8/25.2, m=10, n=0, and m'=0] (see, Table 1).

Synthesis Example 8

Preparation of Nonionic Surfactant (8)

In an autoclave equipped with a stirrer, a temperature controller, and an automatic feeder, a mixture of 139.1 g of linear saturated alcohol having 12 carbon atoms and 53.9 g of linear saturated alcohol having 14 carbon atoms ($C_{12}$ alcohol/$C_{14}$ alcohol (molar ratio)=74.8/25.2) and 1.1 g of potassium hydroxide were introduced and dehydrated for 30 minutes at 110° C. under 1.3 kPa. The inner atmosphere of the autoclave was replaced with nitrogen. At an elevated temperature to 120° C., to the reaction mixture was added 116 g of propylene oxide to carry out the addition reaction and aging. Then at a further elevated temperature to 140° C., to the reaction mixture was added 352 g of ethylene oxide to carry out the addition reaction and aging. After the completion of the reaction, to the autoclave cooled to 80° C. was added 1.2 g of acetic acid. The mixture was stirred for 30 minutes at 80° C. and taken out to obtain a nonionic surfactant (8) as a comparative component applying to the formula (1) [wherein, R had a molar ratio of n-$C_{12}$/n-$C_{14}$ equal to 74.8/25.2, m=0, n=2, and m'=8] (see, Table 1).

Synthesis Example 9

Preparation of Nonionic Surfactant (9)

In an autoclave equipped with a stirrer, a temperature controller, and an automatic feeder, a mixture of 139.1 g of linear saturated alcohol having 12 carbon atoms and 53.9 g of linear saturated alcohol having 14 carbon atoms ($C_{12}$ alcohol/$C_{14}$ alcohol (molar ratio)=74.8/25.2) and 1.1 g of potassium hydroxide were introduced and dehydrated for 30 minutes at 110° C. under 1.3 kPa. The inner atmosphere of the autoclave was replaced with nitrogen. Then at an elevated temperature to 140° C., to the reaction mixture was added 881 g of ethylene oxide to carry out the addition reaction and aging. Then at a cooled temperature to 120° C., to the reaction mixture was added 116 g of propylene oxide to carry out the addition reaction and aging. Again at an elevated temperature to 140° C., to the reaction mixture was added 881 g of ethylene oxide to carry out the addition reaction and aging. After the completion of the reaction, to the autoclave cooled to 80° C. was added 1.2 g of acetic acid. The mixture was stirred for 30 minutes at 80° C. and taken out to obtain a nonionic surfactant (9) as a comparative component applying to the formula (1) [wherein, R had a molar ratio of n-$C_{12}$/n-$C_{14}$ equal to 74.8/25.2, m=20, n=2, and m'=20] (see, Table 1).

Synthesis Example 10

Preparation of Nonionic Surfactant (10)

In an autoclave equipped with a stirrer, a temperature controller, and an automatic feeder, a mixture of 139.1 g of linear saturated alcohol having 12 carbon atoms and 53.9 g of linear saturated alcohol having 14 carbon atoms ($C_{12}$ alcohol/$C_{14}$ alcohol (molar ratio)=74.8/25.2) and 1.1 g of potassium hydroxide were introduced and dehydrated for 30 minutes at 110° C. under 1.3 kPa. The inner atmosphere of the autoclave was replaced with nitrogen. At an elevated temperature to 140° C., to the reaction mixture was added 1762 g of ethylene oxide to carry out the addition reaction and aging. Then at a cooled temperature to 120° C., to the reaction mixture was added 116 g of propylene oxide to carry out the addition reaction and aging.

After the completion of the reaction, to the autoclave cooled to 80° C. was added 1.2 g of acetic acid. The mixture was stirred for 30 minutes at 80° C. and taken out to obtain a nonionic surfactant (10) as a comparative component applying to the formula (1) [wherein, R had a molar ratio of n-$C_{12}$/n-$C_{14}$ equal to 74.8/25.2, m=40, n=2, and m'=0] (see, Table 1).

Synthesis Example 11

Preparation of Nonionic Surfactant (11)

In an autoclave equipped with a stirrer, a temperature controller, and an automatic feeder, 194 g of synthetic alcohol [trade name: SAFOL 23 (SASOL), a saturated alcohol having branched alkyl groups having 12 and 13 carbon atoms (branching rate: 500)] and 1.1 g of potassium hydroxide were introduced and dehydrated for 30 minutes at 110° C. under 1.3 kPa. The inner atmosphere of the autoclave was replaced with nitrogen. Then at an elevated temperature to 140° C., to the reaction mixture was added 441 g of ethylene oxide to carry out the addition reaction and aging. After the completion of the reaction, to the autoclave cooled to 80° C. was added 1.2 g of acetic acid. The mixture was stirred for 30 minutes at 80° C. and taken out to obtain a nonionic surfactant (11) as a comparative component applying to the formula (1) [wherein, R contained a branched alkyl group and had a molar ratio of $C_{12}/C_{14}$ equal to 55/45, m=10, n=0, and m'=0] (see, Table 1).

Synthesis Example 12

Preparation of Sulfuric Acid Ester Salt (1)

In an autoclave equipped with a stirrer, a temperature controller, and an automatic feeder, a mixture of 139.1 g of linear saturated alcohol having 12 carbon atoms [trade name: Kalcol 2098, Kao Corporation] and 53.9 g of linear saturated alcohol having 14 carbon atoms [trade name: Kalcol 4098, Kao Corporation] ($C_{12}$ alcohol/$C_{14}$ alcohol (molar ratio)=74.8/25.2) and 1.1 g of potassium hydroxide were introduced and dehydrated for 30 minutes at 110° C. under 1.3 kPa. The inner atmosphere of the autoclave was replaced with nitrogen. At an elevated temperature to 120° C., to the reaction mixture was added 29 g of propylene oxide to carry out the addition reaction and aging. Then at a further elevated temperature to 140° C., to the reaction mixture was added 66 g of ethylene oxide to carry out the addition reaction and aging. After the completion of the reaction, to the autoclave cooled to 80° C. was added 1.2 g of acetic acid. The mixture was stirred for 30 minutes at 80° C. and taken out to obtain an alkoxylate having average addition mole numbers of propylene oxide and ethylene oxide of 0.5 and 1.5, respectively.

The obtained alkoxylate was sulfated with an $SO_3$ gas in a falling-film reactor.

The sulfated product was neutralized with an aqueous NaOH solution to obtain a sulfuric acid ester salt (1) having the formula (2) [wherein, $R^1$ had a molar ratio of n-$C_{12}$/n-$C_{14}$ equal to 74.8/25.2, x=0.5, y=1.5, and M=Na] (see, Table 2).

Synthesis Example 13

Preparation of Sulfuric Acid Ester Salt (2)

In an autoclave equipped with a stirrer, a temperature controller, and an automatic feeder, a mixture of 139.1 g of linear saturated alcohol having 12 carbon atoms [trade name: Kalcol 2098, Kao Corporation] and 53.9 g of linear saturated alcohol having 14 carbon atoms [trade name: Kalcol 4098, Kao Corporation] ($C_{12}$ alcohol/$C_{14}$ alcohol (molar ratio)=74.8/25.2) and 1.1 g of potassium hydroxide were introduced and dehydrated for 30 minutes at 110° C. under 1.3 kPa. The inner atmosphere of the autoclave was replaced with nitrogen. At an elevated temperature to 120° C., to the reaction mixture was added 87 g of propylene oxide to carryout the addition reaction and aging. After the completion of the reaction, to the autoclave cooled to 80° C. was added 1.2 g of acetic acid. The mixture was stirred for 30 minutes at 80° C. and taken out to obtain an alkoxylate having an average addition mole number of propylene oxide of 1.5.

The obtained alkoxylate was sulfated with an $SO_3$ gas in a falling-film reactor.

The sulfated product was neutralized with an aqueous NaOH solution to obtain a sulfuric acid ester salt (2) having the formula (2) [wherein, Fe had a molar ratio of n-$C_{12}$/n-$C_{14}$ equal to 74.8/25.2, x=1.5, y=0, and M=Na] (see, Table 2).

Synthesis Example 14

Preparation of Sulfuric Acid Ester Salt (3)

In an autoclave equipped with a stirrer, a temperature controller, and an automatic feeder, a mixture of 139.1 g of linear saturated alcohol having 12 carbon atoms [trade name: Kalcol 2098, Kao Corporation] and 53.9 g of linear saturated alcohol having 14 carbon atoms [trade name: Kalcol 4098, Kao Corporation] ($C_{12}$ alcohol/$C_{14}$ alcohol (molar ratio)=74.8/25.2) and 1.1 g of potassium hydroxide were introduced and dehydrated for 30 minutes at 110° C. under 1.3 kPa. The inner atmosphere of the autoclave was replaced with nitrogen. At an elevated temperature to 120° C., to the reaction mixture was added 232 g of propylene oxide to carry out the addition reaction and aging. Then at a further elevated temperature to 140° C., to the reaction mixture was added 66 g of ethylene oxide to carry out the addition reaction and aging. After the completion of the reaction, to the autoclave cooled to 80° C. was added 1.2 g of acetic acid. The mixture was stirred for 30 minutes at 80° C. and taken out to obtain an alkoxylate having an average addition mole number of propylene oxide and ethylene oxide of 4.0 and 1.5, respectively.

The obtained alkoxylate was sulfated with an $SO_3$ gas in a falling-film reactor. The sulfated product was neutralized with an aqueous NaOH solution to obtain a sulfuric acid ester salt (3) having the formula (2) [wherein, $R^1$ had a molar ratio of n-$C_{12}$/n-$C_{14}$ equal to 74.8/25.2, x=4.0, y=1.5, and M=Na] (see, Table 2).

Synthesis Example 15

Preparation of Sulfuric Acid Ester Salt (4)

In an autoclave equipped with a stirrer, a temperature controller, and an automatic feeder, a mixture of 139.1 g of linear saturated alcohol having 12 carbon atoms [trade name: Kalcol 2098, Kao Corporation] and 53.9 g of linear saturated alcohol having 14 carbon atoms [trade name: Kalcol 4098, Kao Corporation] ($C_{12}$ alcohol/$C_{14}$ alcohol (molar ratio)=74.8/25.2) and 1.1 g of potassium hydroxide were introduced and dehydrated for 30 minutes at 110° C. under 1.3 kPa. The inner atmosphere of the autoclave was replaced with nitrogen. At an elevated temperature to 120° C., to the reaction mixture was added 29 g of propylene oxide to carry out the addition reaction and aging. Then at a further elevated temperature to 140° C., to the reaction mixture was added 176 g of ethylene oxide to carry out the addition reaction and aging. After the completion of the reaction, to the autoclave cooled to 80° C. was added 1.2 g of acetic acid. The mixture was stirred for 30 minutes at 80° C. and taken out to obtain an alkoxylate having an average addition mole number of propylene oxide and ethylene oxide of 0.5 and 4.0, respectively.

The obtained alkoxylate was sulfated with an $SO_3$ gas in a falling-film reactor. The sulfated product was neutralized with an aqueous NaOH solution to obtain a sulfuric acid ester salt (4) having the formula (2) [wherein, $R^1$ had a molar ratio of n-$C_{12}$/n-$C_{14}$ equal to 74.8/25.2, x=0.5, y=4.0, and M=Na] (see, Table 2).

Synthesis Example 16

Preparation of Sulfuric Acid Ester Salt (5)

In an autoclave equipped with a stirrer, a temperature controller, and an automatic feeder, a mixture of 139.1 g of linear saturated alcohol having 12 carbon atoms [trade name: Kalcol 2098, Kao Corporation] and 53.9 g of linear saturated alcohol having 14 carbon atoms [trade name: Kalcol 4098, Kao Corporation] ($C_{12}$ alcohol/$C_{14}$ alcohol (molar ratio)=74.8/25.2) and 1.1 g of potassium hydroxide were introduced and dehydrated for 30 minutes at 110° C. under 1.3 kPa. The inner atmosphere of the autoclave was replaced with nitrogen. At an elevated temperature to 140° C., to the reaction mixture was added 88 g of ethylene oxide to carry out the addition reaction and aging. After the completion of the reaction, to the autoclave cooled to 80° C. was added 1.2 g of acetic acid. The mixture was stirred for 30 minutes at 80° C. and taken out to obtain an alkoxylate having an average addition mole number of ethylene oxide of 2.

The obtained alkoxylate was sulfated with an $SO_3$ gas in a falling-film reactor.

The sulfated product was neutralized with an aqueous NaOH solution to obtain a sulfuric acid ester salt (5) as a comparative component applying to the formula (2) [wherein, $R^1$ had a molar ratio of n-$C_{12}$/n-$C_{14}$ equal to 74.8/25.2, x=0, and y=2] (see, Table 2).

Synthesis Example 17

Preparation of Sulfuric Acid Ester Salt (6)

In an autoclave equipped with a stirrer, a temperature controller, and an automatic feeder, a mixture of 139.1 g of linear saturated alcohol having 12 carbon atoms [trade name: Kalcol 2098, Kao Corporation] and 53.9 g of linear saturated alcohol having 14 carbon atoms [trade name: Kalcol 4098, Kao Corporation] ($C_{12}$ alcohol/$C_{14}$ alcohol (molar ratio)=74.8/25.2) and 1.1 g of potassium hydroxide were introduced and dehydrated for 30 minutes at 110° C. under 1.3 kPa. The inner atmosphere of the autoclave was replaced with nitrogen. At an elevated temperature to 120° C., to the reaction mixture was added 697 g of propylene oxide to carry out the addition reaction and aging. Then at a further elevated temperature to 140° C., to the reaction mixture was added 66 g of ethylene oxide to carry out the addition reaction and aging. After the completion of the reaction, to the autoclave cooled to 80° C. was added 1.2 g of acetic acid. The mixture was stirred for 30 minutes at 80° C. and taken out to obtain an alkoxylate having average addition mole numbers of propylene oxide and ethylene oxide of 12.0 and 1.5, respectively.

The obtained alkoxylate was sulfated with an $SO_3$ gas in a falling-film reactor. The sulfated product was neutralized with an aqueous NaOH solution to obtain a sulfuric acid ester salt (6) having the formula (2) [wherein, $R^1$ had a molar ratio of n-$C_{12}$/n-$C_{14}$ equal to 74.8/25.2, x=12.0, y=1.5, and M=Na] (see, Table 2).

Synthesis Example 18

Preparation of Sulfuric Acid Ester Salt (7)

In an autoclave equipped with a stirrer, a temperature controller, and an automatic feeder, a mixture of 139.1 g of linear saturated alcohol having 12 carbon atoms [trade name: Kalcol 2098, Kao Corporation] and 53.9 g of linear saturated alcohol having 14 carbon atoms [trade name: Kalcol 4098, Kao Corporation] ($C_{12}$ alcohol/$C_{14}$ alcohol (molar ratio)=74.8/25.2) and 1.1 g of potassium hydroxide were introduced and dehydrated for 30 minutes at 110° C. under 1.3 kPa. The inner atmosphere of the autoclave was replaced with nitrogen. At an elevated temperature to 120° C., to the reaction mixture was added 29 g of propylene oxide to carry out the addition reaction and aging. Then at a further elevated temperature to 140° C., to the reaction mixture was added 1542 g of ethylene oxide to carry out the addition reaction and aging. After the completion of the reaction, to the autoclave cooled to 80° C. was added 1.2 g of acetic acid. The mixture was stirred for 30 minutes at 80° C. and taken out to obtain an alkoxylate having average addition mole numbers of propylene oxide and ethylene oxide of 0.5 and 35.0, respectively.

The obtained alkoxylate was sulfated with an $SO_3$ gas in a falling-film reactor. The sulfated product was neutralized with an aqueous NaOH solution to obtain a sulfuric acid ester salt (7) having the formula (2) [wherein, $R^1$ had a molar ratio of n-$C_{12}$/n-$C_{14}$ equal to 74.8/25.2, x=0.5, y=35.0, and M=Na] (see, Table 2).

TABLE 1

| | | Nonionic surfactant | | | | | | | | | | |
|---|---|---|---|---|---|---|---|---|---|---|---|---|
| | | (1) a-1 | (2) a-2 | (3) a-3 | (4) a-4 | (5) a-5 | (6) a-6 | (7) a'-1 | (8) a'-2 | (9) a'-3 | (10) a'-4 | (11) a'-5 |
| Composition of hydrocarbon group R (% by mole)[cf.1] | $C_8$ | | 7.4 | | | 14.8 | cf.2 | | | | | cf.2 |
| | $C_{10}$ | | 18.1 | 24.2 | | 10 | | | | | | |
| | $C_{12}$ | 74.8 | 39 | 41.1 | 74.8 | 41.1 | | 74.8 | 74.8 | 74.8 | 74.8 | |
| | $C_{14}$ | 25.2 | 24.1 | 26.8 | 25.2 | 26.8 | | 25.2 | 25.2 | 25.2 | 25.2 | |
| | $C_{16}$ | | 7.9 | 7.9 | | 3.8 | | | | | | |
| | $C_{18}$ | | 3.5 | | | 3.5 | | | | | | |

TABLE 1-continued

| | Nonionic surfactant | | | | | | | | | | |
|---|---|---|---|---|---|---|---|---|---|---|---|
| | (1) a-1 | (2) a-2 | (3) a-3 | (4) a-4 | (5) a-5 | (6) a-6 | (7) a'-1 | (8) a'-2 | (9) a'-3 | (10) a'-4 | (11) a'-5 |
| Average EO addition mole number m | 4 | 3 | 8 | 8 | 7 | 4 | 10 | 0 | 20 | 40 | 10 |
| Average PO addition mole number n | 2 | 2.5 | 3 | 2 | 2.5 | 2 | 0 | 2 | 2 | 2 | 0 |
| Average EO mole number m' | 4 | 3 | 8 | 0 | 0 | 4 | 0 | 8 | 20 | 0 | 0 |

[f.1] A composition was calculated from a composition of starting alcohols used in preparation of a nonionic surfactant.
[f.2] A mixture of branched alkyl groups having 12 and 13 carbon atoms (C12 alkyl/C13 alkyl (molar ratio) = 55/45, branching rate: 50%)

TABLE 2

| | Sulfuric acid ester salt | | | | | | |
|---|---|---|---|---|---|---|---|
| | (1) b-1 | (2) b-2 | (3) b-3 | (4) b-4 | (5) b'-1 | (6) b'-2 | (7) b'-3 |
| Composition of hydrocarbon group $R^1$ (% by mole)[f.1] $C_{12}$ | 74.8 | 74.8 | 74.8 | 74.8 | 74.8 | 74.8 | 74.8 |
| $C_{14}$ | 25.2 | 25.2 | 25.2 | 25.2 | 25.2 | 25.2 | 25.2 |
| Average PO addition mole number x | 0.5 | 1.5 | 4.0 | 0.5 | 0 | 12.0 | 0.5 |
| Average EO addition mole number y | 1.5 | 0 | 1.5 | 4.0 | 2 | 1.5 | 35.0 |

[f.1] A composition was calculated from a composition of starting alcohols used in preparation of a nonionic surfactant.

MODEL DVM-B) under the following conditions: rotor: No. 1 to 4, rotation number: 30 r/min, measuring time: 60 seconds, and measuring temperature: 5° C.

<Evaluation of Stability (Appearance)>

40 ml of a detergent composition was placed in a 50 ml colorless clear glass bottle. The bottle was sealed and allowed to stand for 3 days at 0° C. The detergent was then examined for its appearance and rated according to the following criterion.

Criterion for Appearance:
o: homogeneous and clear
x: clouded or separated

TABLE 3

| | | | | Example | | Comparative example | | |
|---|---|---|---|---|---|---|---|---|
| | | | | 1 | 2 | 1 | 2 | 3 |
| Liquid detergent composition | Compounding component (% by weight) | (a) | a-1 | 20 | | | 20 | |
| | | | a-4 | | 20 | | | |
| | | (a') | a'-1 | | | 20 | | 20 |
| | | (b) | b-1 | 15 | 15 | | | 15 |
| | | (b') | b'-1 | | | 15 | 15 | |
| | Ion-exchanged water | | | Balance | Balance | Balance | Balance | Balance |
| | pH (20° C.)[*1] | | | 8 | 8 | 8 | 8 | 8 |
| | (a)/[(a) + (b)] % by mole | | | 44 | 44 | 45 | 44 | 45 |
| Result of evaluation | Viscosity (mPa · s/5° C.) | | | 550 | 600 | No fluidity | 720 | No fluidity |
| | Appearance | | | o | o | x | x | x |

[*1] A pH was adjusted with sodium hydroxide and/or sulfuric acid as a pH adjusting agent.

Examples 1 and 2 and Comparative Examples 1 to 3

Nonionic surfactants and sulfuric acid ester salts (sodium salts) prepared in Synthesis Examples and ion-exchanged water were used in amounts shown in Table 3 to produce liquid detergent compositions. These liquid detergent compositions were evaluated for fluidity and stability under a cool temperature environment according to the following methods. Evaluation results are shown in Table 3. In Table 3, compositions were represented in % by weight based on effective amounts of components.

<Evaluation of Fluidity (Viscosity)>

A viscosity of a detergent composition was measured with a B-type viscometer (Tokyo Keiki Inc., VISCOMETER Examples 3 to 12 and Comparative Examples 4 to 13

Nonionic surfactants and sulfuric acid ester salts (sodium salts) prepared in Synthesis Examples and other components shown in Table 4 were used in amounts shown in Table 4 to produce liquid detergent compositions. These liquid detergent compositions were evaluated for fluidity and stability under a cool temperature environment in the same manner as for Examples 1 and 2. Detergency thereof was evaluated according to the following method. Evaluation results are shown in Table 4. In Table 4, compositions were represented in % by weight based on solid contents of components.

<Evaluation of Detergency>

(1) Preparation of Test Cloth

To 75 L of ethylene tetrachloride were added 1531.2 g of organic grime and 240 g of carbon paste, compositions of which were described below, and sonicated for 10 minutes to disperse.

A washed cloth (wool muslin) of 10 cm width was immersed in the bath thus prepared, and dried in the air to obtain a grimy cloth. The grimy cloth was cut into pieces having the dimensions of 10 cm by 10 cm.

Next, a washed cloth (wool muslin) having the dimensions of 120 cm by 40 cm was folded in half (60 cm by 40 cm) and stitched up in a cylindrical form. On the center part of one surface (front side) thereof, three pieces of the grimy cloth were sewn to obtain a test cloth.

A composition of the organic grime for begriming the cloth was as follows: 44.8% by weight of cottonseed oil, 10.8% by weight of cholesterol, 10.8% by weight of oleic acid, 7.8% by weight of palmitic acid, 2.0% by weight of cetyl alcohol, 5.1% by weight of solid paraffin, and 5.1% by weight of liquid paraffin (86.4% by weight in total). A composition of the carbon paste was as follows: 0.2% by weight of Asahi carbon black and 13.4% by weight of cottonseed oil (13.6% by weight in total). In these compositions, "% by weight" refers to a percentage in the amount of the mixture of the organic grime and the carbon paste.

(2) Washing Treatment

In an auto washer (Toshiba AW-D802VP) containing 30 L of tap water, three test clothes (nine pieces of the artificial grimy cloth) and 40 ml of a liquid detergent composition shown in Table 1 were placed and subjected to a standard course for washing. In washing, tap water was adjusted to 20° C. to be used. Washed test clothes were allowed to stand for 24 hours in a constant temperature/constant humidity chamber at 20° C. and 65% RH to dry.

(3) Evaluation of Detergency

A washed artificial grimy cloth was measured for reflectance ($\lambda$=550 μm). A washing rate was calculated according to the following equation. For evaluation, among nine pieces of artificial grimy cloth, two pieces having the highest and the second highest washing rates and two pieces having the lowest and the second lowest washing rates were excluded, and the rest five pieces were used to calculate an average rate and evaluate detergency.

washing rate(%)=(reflectance after washing−reflectance before washing)/(reflectance of original cloth−reflectance before washing)×100

TABLE 4

| | | | | Example | | | | | | | | | |
|---|---|---|---|---|---|---|---|---|---|---|---|---|---|
| | | | | 3 | 4 | 5 | 6 | 7 | 8 | 9 | 10 | 11 | 12 |
| Liquid detergent composition | Compounding component (% by weight) | (a) | a-1 | 20 | | | 20 | 20 | 20 | | | | |
| | | | a-2 | | 20 | | | | | | | | |
| | | | a-3 | | | 20 | | | | | | | |
| | | | a-4 | | | | | | | 20 | | | 20 |
| | | | a-5 | | | | | | | | 20 | | |
| | | | a-6 | | | | | | | | | 20 | |
| | | (a') | a'-1 | | | | | | | | | | |
| | | | a'-2 | | | | | | | | | | |
| | | | a'-3 | | | | | | | | | | |
| | | | a'-4 | | | | | | | | | | |
| | | | a'-5 | | | | | | | | | | |
| | | (b) | b-1 | 10 | 10 | 10 | | | | 10 | 10 | 10 | |
| | | | b-2 | | | | 10 | | | | | | 10 |
| | | | b-3 | | | | | 10 | | | | | |
| | | | b-4 | | | | | | 10 | | | | |
| | | (b') | b'-1 | | | | | | | | | | |
| | | | b'-2 | | | | | | | | | | |
| | | | b'-3 | | | | | | | | | | |
| | | (c) | c-1 | 3 | 3 | 3 | 3 | 3 | 3 | 3 | 3 | 3 | 3 |
| | | others | d-1 | 5 | 5 | 5 | 5 | 5 | 5 | 5 | 5 | 5 | 5 |
| | | | e-1 | 3 | 3 | 3 | 3 | 3 | 3 | 3 | 3 | 3 | 3 |
| | | | f-1 | | | | | | | | | | |
| | | | Ion-exchanged water | Balance | Balance | Balance | Balance | Balance | Balance | Balance | Balance | Balance | Balance |
| | pH (20° C.)*1 | | | 8 | 8 | 8 | 8 | 8 | 8 | 8 | 8 | 8 | 8 |
| | (a)/[(a) + (b)] % by mole | | | 54 | 57 | 42 | 54 | 64 | 60 | 54 | 55 | 54 | 54 |
| Result of evaluation | Viscosity (mPa·s/5° C.) | | | 1500 | 1000 | 1800 | 1600 | 2200 | 2300 | 1400 | 1100 | 1900 | 1600 |
| | Appearance | | | ○ | ○ | ○ | ○ | ○ | ○ | ○ | ○ | ○ | ○ |
| | Washing rate (detergency) | | | 54 | 51 | 47 | 51 | 45 | 46 | 53 | 51 | 48 | 50 |

| | | | | Comparative example | | | | | | | | |
|---|---|---|---|---|---|---|---|---|---|---|---|---|
| | | | | 4 | 5 | 6 | 7 | 8 | 9 | 10 | 11 | 12 | 13 |
| Liquid detergent composition | Compounding component (% by weight) | (a) | a-1 | | | | | | | 20 | 20 | 20 | |
| | | | a-2 | | | | | | | | | | |
| | | | a-3 | | | | | | | | | | |
| | | | a-4 | | | | | | | | | | |
| | | | a-5 | | | | | | | | | | |
| | | | a-6 | | | | | | | | | | |
| | | (a') | a'-1 | 20 | | | | | | | | 10 | 20 |
| | | | a'-2 | | 20 | | | | | | | | |
| | | | a'-3 | | | 20 | | | | | | | |
| | | | a'-4 | | | | 20 | | | | | | |
| | | | a'-5 | | | | | 20 | | | | | |

TABLE 4-continued

| | | | | | | | | | | | | |
|---|---|---|---|---|---|---|---|---|---|---|---|---|
| | (b) | b-1 | 10 | 10 | 10 | 10 | 10 | | | | | |
| | | b-2 | | | | | | | | | | |
| | | b-3 | | | | | | | | | | |
| | | b-4 | | | | | | | | | | |
| | (b') | b'-1 | | | | | | | 10 | | 5 | 10 |
| | | b'-2 | | | | | | 10 | | | | |
| | | b'-3 | | | | | | | | 10 | | |
| | (c) | c-1 | 3 | 3 | 3 | 3 | 3 | 3 | 3 | 3 | 3 | 3 |
| | others | d-1 | 5 | 5 | 5 | 5 | 5 | 5 | 5 | 5 | 5 | 5 |
| | | e-1 | 3 | 3 | 3 | 3 | 3 | 3 | 3 | 3 | 3 | 3 |
| | | f-1 | | | | | | | | | | 10 |
| | | Ion-exchanged water | Balance | Balance | Balance | Balance | Balance | Balance | Balance | Balance | Balance | Balance |
| | pH (20° C.)*1 | | 8 | 8 | 8 | 8 | 8 | 8 | 8 | 8 | 8 | 8 |
| | (a)/[(a) + (b)] % by mole | | 55 | 54 | 27 | 27 | 55 | 54 | 76 | 85 | 55 | 55 |
| Result of evaluation | Viscosity (mPa·s/5° C.) | | 5100 | 3600 | 4500 | 4500 | 4800 | 1700 | 4200 | 6500 | 2200 | 1800 |
| | Appearance | | x | x | x | x | x | x | x | x | x | x |
| | Washing rate (detergency) | | 52 | 48 | 37 | 34 | 45 | 47 | 38 | 33 | 41 | 46 |

*1 A pH was adjusted with sodium hydroxide and/or sulfuric acid as a pH adjusting agent.

The invention claimed is:

1. A detergent composition, comprising (a) a nonionic surfactant represented by the formula (1) [hereinafter, referred to as component (a)], and (b) a sulfuric acid ester salt represented by the formula (2) [hereinafter, referred to as component (b)]:

$$R\text{—}O\text{-}(EO)_m\text{—}(PO)_n\text{-}(EO)_{m'}\text{—}H \quad (1)$$

wherein, R represents a linear or branched, saturated or unsaturated hydrocarbon group having 6 to 24 carbon atoms; EO represents an ethyleneoxy group; PO represents a propyleneoxy group; m represents an average addition mole number ranging from 0.1 to 25; m' represents an average addition mole number ranging from 0 to 24.9; the total of m and m' is 0.5 to 25; and n represents an average addition mole number ranging from 0.1 to 10; with the proviso that $(EO)_m$, $(PO)_n$, and $(EO)_{m'}$ are arranged in a block addition mode in this order;

$$R^1\text{—}O\text{—}(PO)_x\text{-}(EO)_y\text{—}SO_3M \quad (2)$$

wherein, $R^1$ represents a linear or branched, saturated or unsaturated hydrocarbon group having 6 to 24 carbon atoms; PO represents a propyleneoxy group; EO represents an ethyleneoxy group; x represents an average addition mole number ranging from 0.4 to 5; y represents an average addition mole number ranging from 0 to 4, $(PO)_x$ and $(EO)_y$ are arranged in any addition mode, being either a block addition or a random addition in any order, when y is not 0; and M represents a counter ion to form a salt.

2. The detergent composition according to claim 1, wherein a proportion of the component (a) to the total amount of the components (a) and (b) is 10 to 90% by mole.

3. The detergent composition according to claim 1, further comprising a Ca scavenger.

4. The detergent composition according to claim 3, wherein the content of the Ca scavenger is 1 to 30% by weight.

5. The detergent composition according to claim 1, wherein the nonionic surfactant represented by the formula (1) used as the component (a) can be produced from a linear or branched, saturated or unsaturated aliphatic alcohol represented by the formula (3):

$$R\text{—}OH \quad (3)$$

wherein, R represents the same meaning as defined above; by adding ethylene oxide and then propylene oxide, and optionally ethylene oxide as necessary in this order in a block addition mode.

6. The detergent composition according to claim 1, wherein the component (a) represented by the formula (1) is a nonionic surfactant produced by adding m* mol of ethylene oxide, n* mol of propylene oxide, and further m'* mol of ethylene oxide to one mole of a compound R—OH (wherein, R represents the same meaning as defined above), wherein m* represents a number ranging from 0.1 to 25, m'* represents a number ranging from 0 to 24.9, the total of m* and m'* is 0.5 to 25, and n represents a number ranging from 0.1 to 10.

7. A detergent composition, comprising (a) a nonionic surfactant produced by adding m* mol of ethylene oxide, n* mol of propylene oxide, and further m'* mol of ethylene oxide to one mole of a compound R—OH (wherein, R represents a linear or branched, saturated or unsaturated hydrocarbon group having 6 to 24 carbon atoms), wherein m* represents a number ranging from 0.1 to 25, m'* represents a number ranging from 0 to 24.9, the total of m* and m'* is 0.5 to 25, and n represents a number ranging from 0.1 to 10; and (b) a sulfuric acid ester salt represented by the formula (2):

$$R^1\text{—}O\text{—}(PO)_x\text{-}(EO)_y\text{—}SO_3M \quad (2)$$

wherein, $R^1$ represents a linear or branched, saturated or unsaturated hydrocarbon group having 6 to 24 carbon atoms; PO represents a propyleneoxy group; EO represents an ethyleneoxy group; x represents an average addition mole number ranging from 0.4 to 5; y represents an average addition mole number ranging from 0 to 4, $(PO)_x$ and $(EO)_y$ are arranged in any addition mode, being either a block addition or a random addition in any order, when y is not 0; and M represents a counter ion to form a salt.

8. The detergent composition according to claim 1, wherein the component (b) is a sulfuric acid ester salt represented by the formula (2) and $(PO)_x$ and $(EO)_y$ are added as blocks in this order.

9. The detergent composition according to claim 1, wherein the component (a) is a nonionic surfactant represented by the formula (1); the sum of m and m' (m+m') is equal to 1 to 20; and n represents an average PO addition mole number of 0.5 to 5.

10. The detergent composition according to claim 1, wherein the component (a) is a nonionic surfactant represented by the formula (1); the sum of m and m' (m+m') is equal to 2 to 15; and n represents an average PO addition mole number of 1 to 4.

11. The detergent composition according to claim 1, further comprising a solvent selected from the group consisting of ethanol, isopropyl alcohol and propylene glycol in the total amount of less than 5% by weight.

12. The detergent composition according to claim 1, wherein the content of the component (a) is from 3 to 60% by weight and the content of the component (b) is from 3 to 50% by weight.

13. The detergent composition according to claim 1, wherein the detergent composition has a viscosity of 2300 mPa·s or less at 5° C.

\* \* \* \* \*